US010346915B1

(12) United States Patent
Tang et al.

(10) Patent No.: US 10,346,915 B1
(45) Date of Patent: Jul. 9, 2019

(54) SYSTEMS AND METHODS FOR HIERARCHICAL DUAL-DYNAMIC EXCEPTION MANAGEMENT

(71) Applicant: JPMorgan Chase Bank, N.A., New York, NY (US)

(72) Inventors: John Tang, Long Island City, NY (US); Rajesh L. Tolani, Upper Saddle River, NJ (US); Jeremy M. Dobrick, New York, NY (US); Frank Joseph Van Hoof, Ringwood (GB); Ciaran A. Kelly, Dublin (IE); Kirk Trivett, Hornchurch (GB); David C. Bertram, London (GB); Christine Duggan, Warwick, NY (US); Jayant V. Gokhale, Edison, NJ (US); Benjamin F. Sylvester, III, Darien, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 502 days.

(21) Appl. No.: 15/150,714

(22) Filed: May 10, 2016

Related U.S. Application Data

(60) Provisional application No. 62/159,558, filed on May 11, 2015.

(51) Int. Cl.
*G07B 17/00* (2006.01)
*G07F 19/00* (2006.01)
(Continued)

(52) U.S. Cl.
CPC ............ *G06Q 40/04* (2013.01); *G06Q 40/12* (2013.12)

(58) Field of Classification Search
None
See application file for complete search history.

(56) References Cited

U.S. PATENT DOCUMENTS

| 7,865,426 B2 * | 1/2011 | Volpert | G06Q 40/00 705/35 |
| 8,019,675 B1 * | 9/2011 | Gerber | G06Q 20/10 705/35 |

(Continued)

*Primary Examiner* — Ariel J Yu
(74) *Attorney, Agent, or Firm* — Hunton Andrews Kurth LLP

(57) ABSTRACT

Systems and methods for hierarchical dual-dynamic exception management are disclosed. In one embodiment, the system and method may provide: (1) hierarchical exception modelling, metric algorithms and aggregation; (2) node level exception metric algorithm and high-level status algorithm calculation; (3) node level investigation via "explain" of exception factors (e.g., focusing an analyst on a particular issue); (4) node level tracking workflow management through ability to add commentary, multiple-person signoff, and high-level status calculation overrides; (5) visibility, auditable compliance reporting; (6) dashboard for internal operational analysts/managers with full investigation view; (7) dashboard for external clients with sub views; (8) generic data interface to existing workflow management system; and (9) machine learning component such that the exception metric can be intelligently re-adjusted (for example, if there are too many false positives then make the thresholds more forgiving). Other features and/or advantages may be provided as is necessary and/or desired.

18 Claims, 5 Drawing Sheets

(51) Int. Cl.
*G06Q 40/00* (2012.01)
*G06Q 40/04* (2012.01)

(56) References Cited

U.S. PATENT DOCUMENTS

| | | | |
|---|---|---|---|
| 2011/0251978 A1* | 10/2011 | Davies | G06Q 40/00 705/36 R |
| 2012/0185372 A1* | 7/2012 | McIntosh | G06Q 40/04 705/37 |
| 2013/0046673 A1* | 2/2013 | Kiron | G06Q 40/04 705/37 |

* cited by examiner

SYSTEMS AND METHODS FOR HIERARCHICAL DUAL-DYNAMIC EXCEPTION MANAGEMENT

RELATED APPLICATIONS

The present application is claims priority to U.S. Provisional Patent Application Ser. No. 62/159,558, the disclosure of which is hereby incorporated, by reference, in its entirety.

BACKGROUND OF THE INVENTION

1. Field of the Invention

The present invention generally relates to payment processing, and, more specifically, to systems and methods for hierarchical dual-dynamic exception management.

2. Description of the Related Art

Accurate and timely unit pricing is an essential goal for fund accountants. This task, however, is often hampered by vast and disparate data, fixed exception thresholds, multiple daily workflows, and significant manual intervention.

A key aspect of any fund accountant process is the verification of pricing components which make up the Net-Asset Value, or "NAV." In general, fixed and constant thresholds are applied to the pricing components. Thus, if the absolute change on a day of a value breaches this tolerance, then an alert is triggered.

SUMMARY OF THE INVENTION

Systems and methods for hierarchical dual-dynamic exception management are disclosed. In one embodiment, a method for hierarchical dual-dynamic exception management may include (1) an exception management system comprising at least one computer processor configuring a hierarchical exception profile comprising a plurality of exceptions, wherein at least one of the exceptions comprises a plurality of sub-exceptions, each exception and sub-exception having at least an exception metric, a high-level status calculation, and an exception explain calculation; (2) the exception management system receiving, from a plurality of external data sources, net-asset value data, the net-asset value data comprising a plurality of components and sub-components, each component associated with an exception, and each sub-component associated with a sub-exception; (3) the exception management system calculating a current daily value of interest for the net-asset value data; (4) the exception management system identifying at least one exception from the hierarchical exception profile based on the current daily value of interest; (5 the exception management system calculating a high-level status and an explain for the identified exception from the hierarchical exception profile; (6) the exception management system publishing the identified exception, the calculated high level status, and the calculated explain to at least one of an internal system and an external system; and (7) the exception management system checking an entitlement of a user accessing the exception, the calculated high level status, and the calculated explain before displaying results to the user.

In one embodiment, the plurality of external data sources may include intra-day data sources and end-of-day data sources.

In one embodiment, the plurality of net-asset value data may include one or more of fund data, portfolio data, income data, expense data, foreign exchange data, and/or benchmark data.

In one embodiment, the receipt of net-asset value data may trigger an alert that new net-access value data is received.

In one embodiment, the high-level status may include a red level, an amber level, and/or a green level.

In one embodiment, the step of calculating a high-level status for an exception based on the daily value of interest may include setting a baseline based on historical observations of the daily value of interest; and setting the high-level status for the exception to an elevated status if the current daily value of interest exceeds the baseline.

In one embodiment, wherein there is first threshold for negative values, and a second threshold for positive values.

In one embodiment, the explain may include a root cause for the exception.

In one embodiment, the method may further include the exception management system receiving an override of the exception.

In one embodiment, the method may further include the exception management system providing an internal operational analyst an exception, a high-level status for the exception, and the explain; the exception management system receiving feedback from the internal operational analyst for the exception; the exception management system providing a machine learning component with the feedback; and the machine learning component of the exception management system automatically adjusting the threshold for the high-level status.

In one embodiment, the threshold may be increased in response to a number of false positives above a predetermined number.

In one embodiment, the method may further include the exception management system receiving a signoff from the internal operational analyst for a funds alert.

In one embodiment, the method may further include the exception management system automatically adjusting a frequency of threshold adjustment.

In one embodiment, the method may further include the exception management system automatically persisting the metric value, RAG value and RAG status, and root cause for the exception.

In one embodiment, hierarchical exception profile may be configurable based on income, bond income, equity income, and/or margin calls and derivatives.

Embodiments of the present invention allow business operational analysts to define an Operational Exception Management (OEM) process in the form of hierarchical collection of trackable sub-exceptions. Each node of the hierarchy may be independently configurable with specific algorithms for metric and high-level status calculation. Each trackable sub-exception node may provide investigative details to explain the factors causing the exception. The exception workflow of each sub-exception may be tracked and managed via commentary and signoff by operational analysts and/or operational managers, thereby providing visibility and auditable compliance reporting. This may allow business operational managers to efficiently and effectively manage exception processes to minimize time and moreover potential compensatory costs and disruption to deliver on agreed client Service Level Agreements (SLAs).

In one embodiment, an end-to-end streamlined exception management system and process is disclosed. The system and method may provide: (1) hierarchical exception modelling, metric algorithms and aggregation; (2) node level exception metric algorithm and high-level status algorithm calculation; (3) node level investigation via "explain" of exception factors (e.g., focusing an analyst on a particular issue); (4) node level tracking workflow management through ability to add commentary, multiple-person signoff, and high-level status calculation overrides; (5) visibility, auditable compliance reporting; (6) dashboard for internal operational analysts/managers with full investigation view; (7) dashboard for external clients with sub views; (8) generic data interface to existing workflow management system; and (9) machine learning component such that the exception metric can be intelligently re-adjusted (for example, if there are too many false positives then make the thresholds more forgiving). Other features and/or advantages may be provided as is necessary and/or desired.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-5.

In one embodiment, adaptive algorithms may be used to reduce operating expenses and risk, while increasing customer satisfaction. Many funds experience differences in positive and negative standard deviations, which empirically challenge the practice of using fixed and constant exception thresholds.

The verification of a fund's NAV price typically considers several components, such as income, expenses, shares class divergence, etc., where each component may be considered as a time series of observations. Typically, this may be performed by calculating the change on day, or CoD, and comparing it to a pre-determined fixed and constant threshold. CoD may be calculated with the following equation:

$$\frac{(x_t - x_{t-1})}{x_{t-1}} \text{ where } x_t \text{ is an observed value on day } t$$

Embodiments disclosed herein focus on fund-level benchmarking, comparing the fund price change on day and benchmark price change on day. This may be defined as:

$$\frac{(U_t + R_t) - (U_{t-1} + R_{t-1})}{N} - (B_t - B_{t-1} - 1)$$

where $U_t$ is the unrealized gain or loss on day t, $R_t$ is the realized gain or loss on day t, N is the total net asset value after capital change, and $B_t$ is the benchmark index price on day t.

Figure 1A:
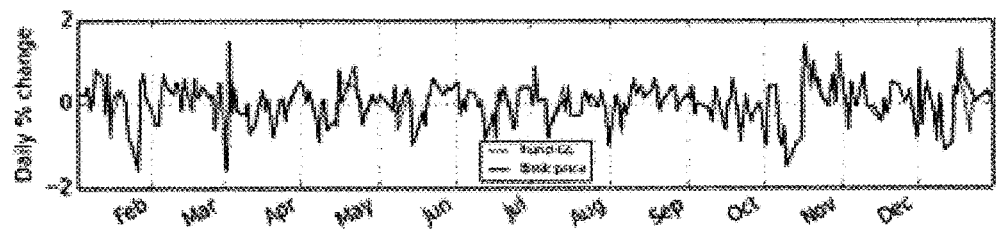
FIG. 1a illustrates an example fund Change on Day ("CoD") against a benchmark index CoD.
Figure 1B:
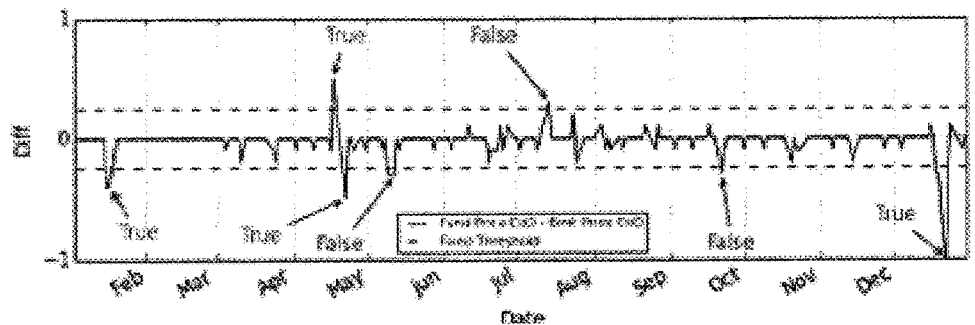
FIG. 1b illustrates a difference between fund price and index price.

FIG. 1a illustrates an example fund CoD against a benchmark index CoD, and FIG. 1b illustrates the difference between fund price and index price. Using a single constant threshold gives rise to false positives. As illustrated, there are more negative true positives than positive true positives.

In one embodiment, an empirical distribution (i.e., a distribution that does not assume Gaussian behavior) may be calculated based on given discrete observations at certain dates. Using this distribution, the empirical standard deviation, or p-values, may be calculated. This may be accomplished by first calculating a continuous empirical distribution (e.g., using kernel density estimation techniques, etc.). Next, the positive and negative standard deviations, or p-values, may be calculated.

In one embodiment, rather than use a constant threshold, one or more adaptive algorithms may be used. In one embodiment, the thresholds may be discretely determined for positive and conditions, and may be re-calibrated periodically, as necessary, etc.

Figure 2:
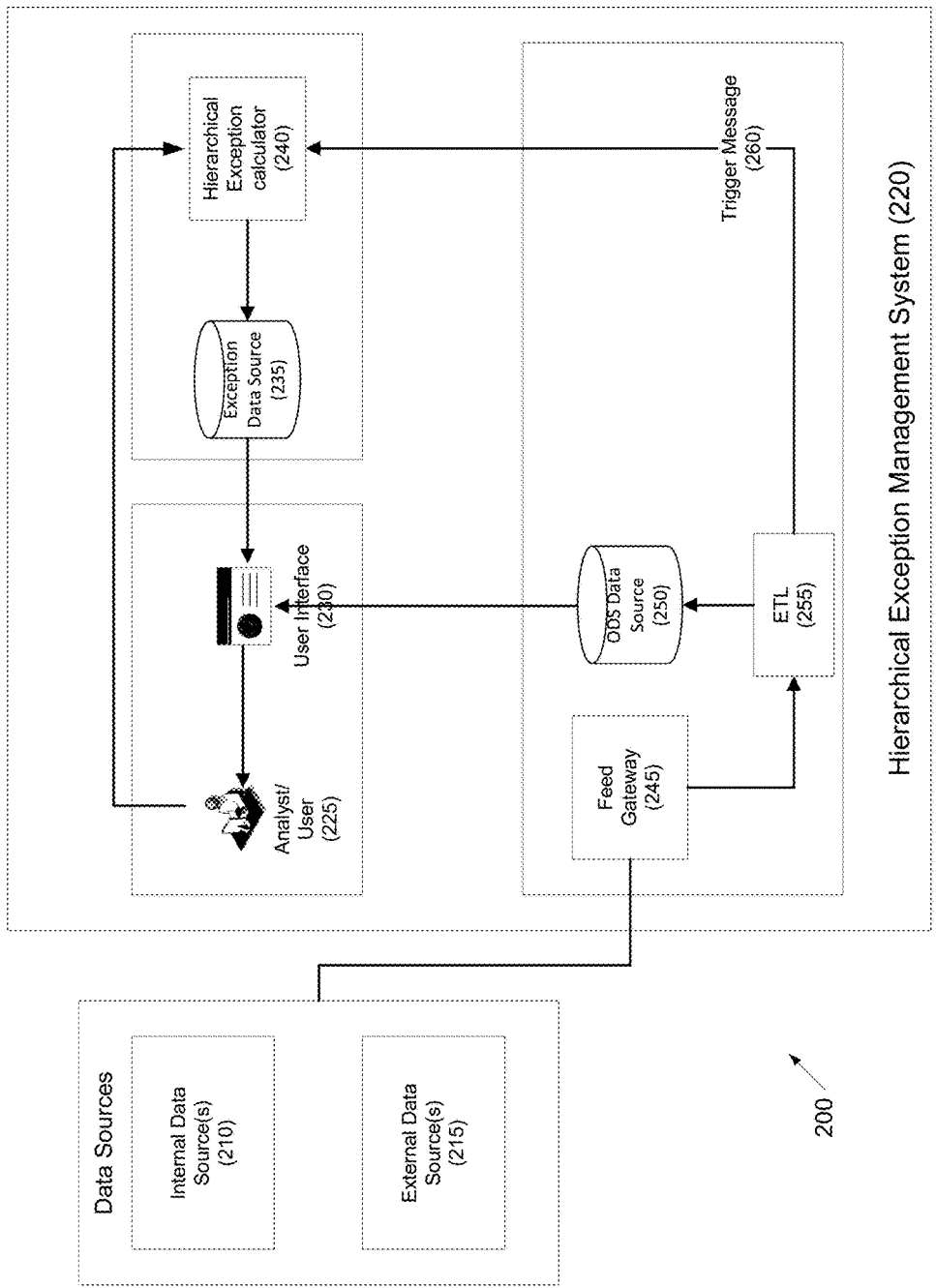
FIG. 2 depicts a system for hierarchical dual-dynamic exception management according to one embodiment.

Referring to FIG. 2, a system for hierarchical exception management is disclosed according to one embodiment. System 200 may include internal data source(s) 210, external data source(s) 215, and hierarchical exception management system 220. Hierarchical exception management system 220 may include analyst/user 225, user interface 230, exception data source 235, hierarchical exception calculator 240, feed gateway 245, Extract, Transform, and Load ("ETL") data 255, ODS data source 250, and trigger message 260.

In one embodiment, internal data source(s) 210 may include data sources with the financial institution, such as internal analysis, data, etc. External data source(s) 215 may include third party data sources, for example, Bloomberg. Feed gateway 245 may receive data feeds from internal data source(s) 210 and external data sources (215). In one embodiment, feed gateway 245 may abstract different data transfer protocol from the different sources.

In one embodiment, ETL 255 may extract, transform, and load the data from feed gateway 250. ODS data source 250 may receive and store transactional data.

Hierarchical exception calculator may perform hierarchical exception and calibration calculations. In one embodiment, exception and calibration results may be stored in exception data store 235.

User interface 230 may display hierarchical exception and calibration data to, for example, analyst 225. Analyst 225 may review, manage, approve, etc. exceptions.

In one embodiment, user interface may be provided on a workstation, a desktop computer, a notebook computer, a tablet computer, a smart phone, or any other suitable electronic device.

Figure 3:
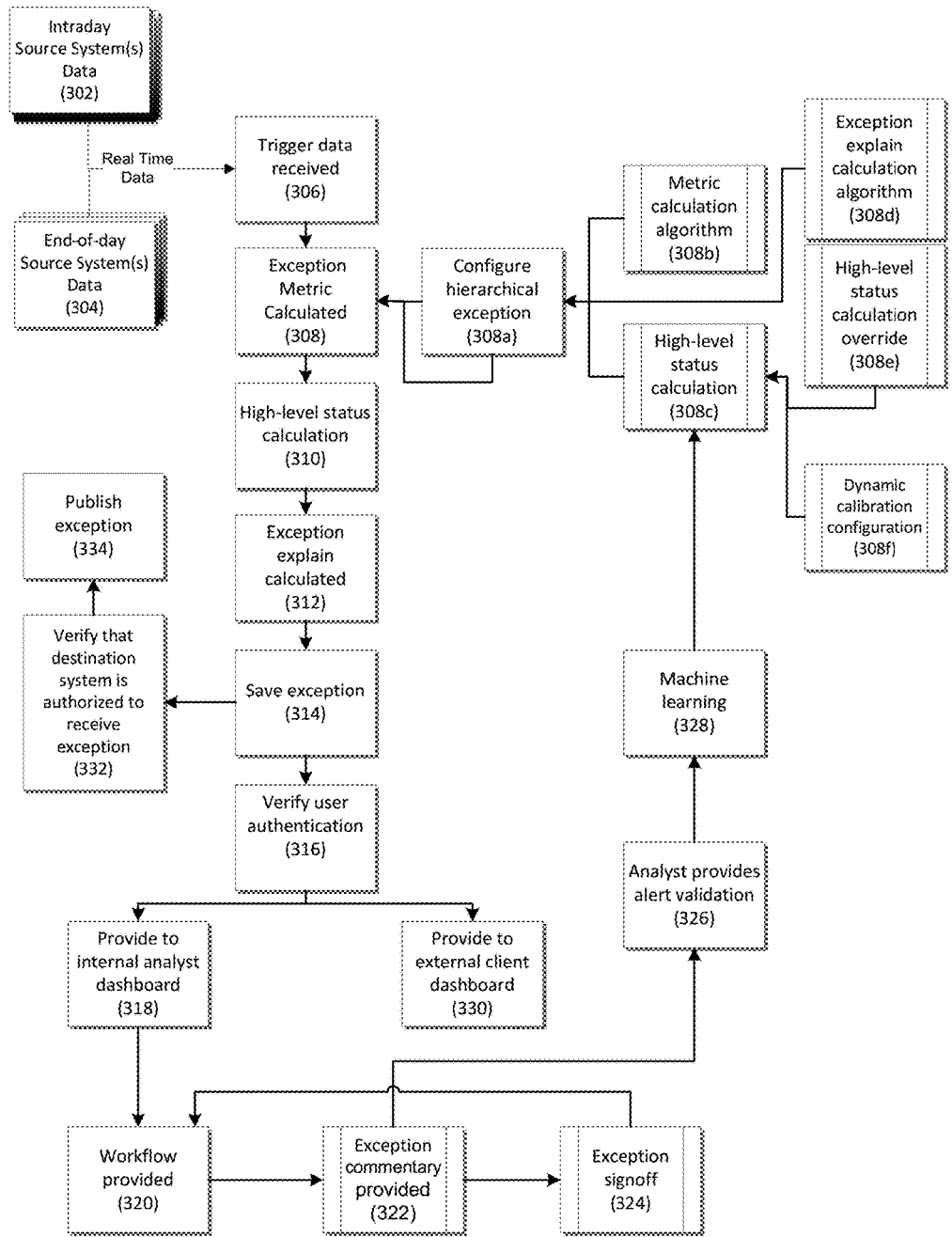
FIG. 3 depicts a method for hierarchical dual-dynamic exception management according to one embodiment.

Referring to FIG. 3, a method for hierarchical exception management is disclosed according to one embodiment. In step 302, data may be received from one or more intraday source system. In one embodiment, the intraday source systems are the systems of record for intraday data. In one embodiment, the data may include data for one or more sub components of NAV, such as fund, portfolio, income, expenses, foreign exchange ("fx"), benchmark data, etc. In one embodiment, the intraday source systems may provide the data in real time, or substantially in real time.

In step 304, data may be received from one or more non-real-time data sources, such as end-of-day source systems. The end-of-day systems may provide some, or all, of the data provided by the intraday source systems, but may provide the data in batches, at the end of the day, overnight, etc.

In step 306, trigger data may be received. In one embodiment, the trigger data may provide a message to the system that new data is loaded and available for processing. For example, data that is received from intraday source systems and/or end-of-day source systems may initiate, or trigger, processing of the received data.

In step 308, an exception metric may be calculated. In one embodiment, the exception metric may be calculated so that a determination may be made as to whether or not the metric exceeds some threshold or tolerance. In one embodiment, two values may be considered: the value of the interest in the metric, and the threshold or tolerance.

In one embodiment, the value of interest may be based on a configuration (e.g., income alert), may be the sum of all sources of income (equity dividends, bond coupons, etc.), etc.

Steps 308a-308f illustrate an example of the interest in the metric calculation.

In step 308a, a hierarchical exception may be configured. For example, a NAV may be broken down into sub components (e.g., market moves, income, expense and other movements such as FX, rates, etc.). Income may then be broken down to bond or equity, then by region, and then by sector, etc. and hence forms a natural hierarchical model. The "configuration" allows these relationships to be modeled.

In step 308b, a metric calculation algorithm may be applied. In one embodiment, this algorithm may be used to calculate the daily value of interest. For example, income could be simply sum of all sources of income for a particular day or accrued over a certain time period.

In step 308c, a high-level status calculation algorithm may be applied to calculate the high-level status based on step 308b. In one embodiment, the high-level status may be a three-tier status, such as red-amber-green (RAG), a two-level status, such as go/no-go, good/bad, high/low, etc. a numerical status (e.g., 1-10), a grade status (e.g., A-F), etc. Any suitable high-level status may be used as necessary and/or desired.

In one embodiment, the high-level status calculation may be a threshold-based approach, for example where a baseline is calculated using historical observations of data in step 308b. If the metric calculated in step 308b breaches the threshold, the high-level status may be "red." If there is no breach, then the high-level status may be green. An "amber" color may signify a warning, such as when data is missing or there are non-critical breaches.

In one embodiment, there may be independent thresholds for both positive and negative values we have independent thresholds.

In step 308d, an exception explain calculation algorithm may be applied. In one embodiment, this algorithm may calculate or determine a root cause, or causes, of an alert. Using income as an example, this might be a table where the rows represent each income line across all holdings. The rows would be sorted by income amount in descending order.

For example, if a total received coupon amount for a fund exceeds a total expected coupon amount, a red alert may be raised. The analyst may then review the "explain" table that may comprise rows of income lines that may include several columns, such as previous income, current income, and difference. The columns may be sorted, for example, by income difference, to focus the analyst on the largest difference.

Other methods and techniques for presenting exceptions to an analysis may be used as is necessary and/or desired.

In step 308e, a high-level status calculation override may be applied. For example, a user and/or analyst may override the automated calculation of alerts if he or she believes that the algorithm has incorrectly calculated the high-level status.

In step 308f, dynamic calibration may configured. In one embodiment, the frequency of the calibration of the high-level status calculation algorithm may be set.

After the exception metric is calculated in step 308, in step 310, a high-level status may be calculated. As noted above, the high-level status may be a three-tier status, such as red-amber-green (RAG), a two-level status, such as go/no-go, good/bad, high/low, etc. a numerical status (e.g., 1-10), a grade status (e.g., A-F), etc. Any suitable high-level status may be used as necessary and/or desired. The status may be calculated based on the algorithm described in step 308c, above.

In step 312, the exception explain, described above with regard to step 308d, may be calculated.

In step 314, the metric value, high-level status, high-level status value, etc., exception explanation, etc. may be stored. The complete, pre-calculated explain may be displayed when required or requested by the user interface.

In one embodiment, in step 332, a check to make sure that the destination system is authorized to receive the published exception may be performed. If it is, in step 334, the exception may be published to the destination systems. In one embodiment, external systems that may subscribe to the results may receive the results. In one embodiment, an external system may be a wholesale customer that subscribes to the raw data, the exception notification, etc.

In step 316, a check may be made to ensure that the data recipient is authorized to receive the results may be made.

If, in step 316, an external client is authorized, in step 330, the results may be proved to an external client This may be an independent view for external clients.

In addition, in step 318, the results may be provided to an internal analyst via, for example, an internal analysis dashboard.

In one embodiment, the internal analyst dashboard may display alerts, status and explains. This may be independent from external user view, discussed below, as external clients may not be provided with alerts or explains, but may only be provided with the alert value.

In step 320, workflow for managing the exception may be provided to the internal analyst. In one embodiment, in step 322, the analyst may enter commentary, and in step 324, the analyst may signoff an exception.

In step 326, the analyst may provide alert validation. For example, the analyst may provide feedback (e.g., true/false positives/negatives) to the machine learning component.

In step 328, based on the feedback from the analyst, a machine learning component may recalibrate the high-level status calculation algorithm. For example, if there are too many false positives, the outlier thresholds may be increased to be more forgiving.

In another embodiment, the machine learning component may refine the algorithm(s) (e.g., the metric calculation algorithm, the explain calculation algorithm, etc.) or may develop new algorithm(s) as is necessary and/or desired.

Other machine learning may be used as is necessary and/or desired.

Figure 4:
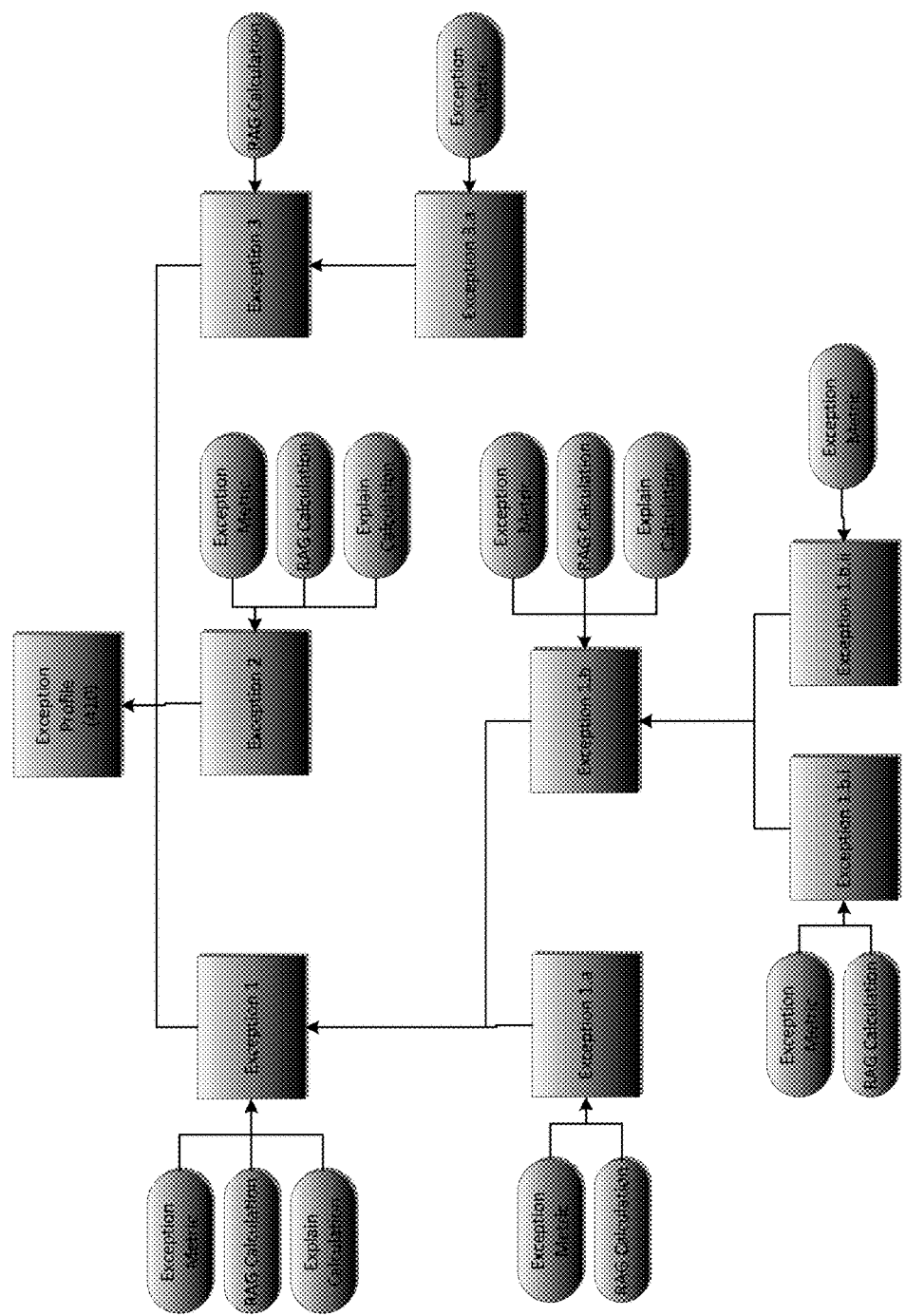
FIG. 4 depicts an example of an exception profile according to one embodiment.

Referring to FIG. 4, an example of a hierarchical configuration of an exception profile according to one embodiment is provided. For example, exception profile 410 may include a plurality of exceptions (e.g., exception 1, exception 2, and exception 3, etc.), and each of these can be again broken down into sub-exceptions (e.g., exceptions 1.a, 1.b, 3.a, etc.). Each sub-exception may include one or more of an exception metric, a high-level status (e.g., RAG) calculation, and an explain calculation.

In one embodiment, each sub-exception may be further broken into sub-exceptions, and so on (e.g., exceptions 1.b.i, 1.b.ii, etc.).

Figure 5:
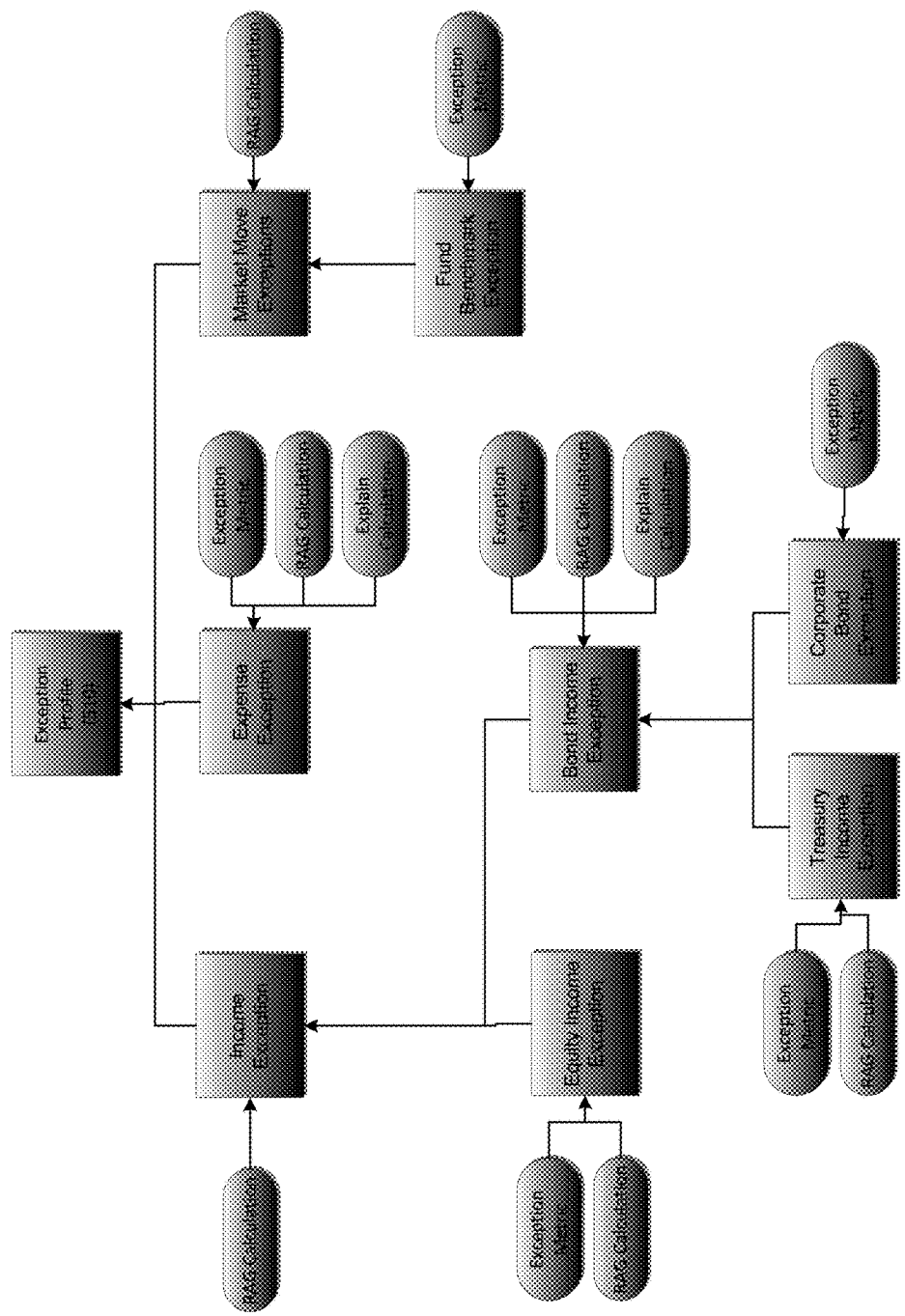
FIG. 5 depicts an example of an exception profile according to one embodiment.

FIG. 5 depicts an example exception profile 510. In this embodiment, exception 1 may be income, exception 2 may be expense, and exception 3 may be market move. Exception 1 may include sub-exceptions equity income and bond income, and sub-exception bond income may further include sub-exceptions treasury income and corporate bond.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for hierarchical dual-dynamic exception management, comprising:
   an exception management system comprising at least one computer processor configuring a hierarchical exception profile comprising a plurality of exceptions, wherein at least one of the exceptions comprises a plurality of sub-exceptions, each exception and sub-exception having at least an exception metric, a high-level status calculation, and an exception explain calculation;
   the exception management system receiving, from a plurality of external data sources, net-asset value data, the net-asset value data comprising a plurality of components and sub-components, each component associated with an exception, and each sub-component associated with a sub-exception;
   the exception management system calculating a current daily value of interest for the net-asset value data;
   the exception management system identifying at least one exception from the hierarchical exception profile based on the current daily value of interest;

the exception management system calculating a high-level status and an explain for the identified exception from the hierarchical exception profile;

the exception management system publishing the identified exception, the calculated high level status, and the calculated explain to at least one of an internal system and an external system; and the exception management system checking an entitlement of a user accessing the exception, the calculated high level status, and the calculated explain before displaying results to the user.

2. The method of claim 1, wherein the plurality of external data sources comprise intra-day data sources and end-of-day data sources.

3. The method of claim 1, wherein the plurality of net-asset value data comprises at least one of fund data, portfolio data, income data, expense data, foreign exchange data, and benchmark data.

4. The method of claim 1, wherein the receipt of net-asset value data triggers an alert that new net-access value data is received.

5. The method of claim 1, wherein the high-level status comprises a at least a red level, an amber level, and a green level.

6. The method of claim 1, wherein the step of calculating a high-level status for an exception based on the daily value of interest comprises:

setting a baseline based on historical observations of the daily value of interest; and setting the high-level status for the exception to an elevated status when the current daily value of interest exceeds the baseline.

7. The method of claim 6, wherein there is first threshold for negative values, and a second threshold for positive values.

8. The method of claim 1, further comprising:

wherein the explain comprises a root cause for the exception.

9. The method of claim 8, further comprising:

the exception management system providing an internal operational analyst an exception, a high-level status for the exception, and the explain;

the exception management system receiving feedback from the internal operational analyst for the exception;

the exception management system providing a machine learning component with the feedback; and the machine learning component of the exception management system automatically adjusting the threshold for the high-level status.

10. The method of claim 9, wherein the threshold is increased in response to a number of false positives above a predetermined number.

11. The method of claim 9, further comprising:

the exception management system automatically adjusting a frequency of threshold adjustment.

12. The method of claim 1, further comprising:

the exception management system receiving an override of the exception.

13. The method of claim 1, further comprising:

the exception management system receiving a signoff from the internal operational analyst for a funds alert.

14. The method of claim 1, further comprising:

the exception management system automatically persisting the metric value, RAG value and RAG status, and the explain.

15. The method of claim 1, wherein the hierarchical exception profile is configurable based on income.

16. The method of claim 1, wherein the hierarchical exception profile is configurable based on bond income.

17. The method of claim 1, wherein the hierarchical exception profile is configurable based on equity income.

18. The method of claim 1, wherein the hierarchical exception profile is configurable based on margin calls and derivatives.

\* \* \* \* \*